US005426555A

United States Patent [19]

Lundquist

[11] Patent Number: 5,426,555

[45] Date of Patent: Jun. 20, 1995

[54] SURGE ARRESTER ARRANGEMENT

[75] Inventor: Jan Lundquist, Ludvika, Sweden

[73] Assignee: ASEA Brown Boveri AB, Västerås, Sweden

[21] Appl. No.: 76,845

[22] Filed: Jun. 15, 1993

[30] Foreign Application Priority Data

Jul. 3, 1992 [SE] Sweden ................................ 9202063

[51] Int. Cl.[6] ................................................ H02H 9/04

[52] U.S. Cl. ...................................... 361/117; 361/124

[58] Field of Search ............... 361/117, 124, 125, 132, 361/39; 337/190, 178

[56] References Cited

U.S. PATENT DOCUMENTS 2,305,436 12/1942 McMorris ........................... 200/115
4,308,566 12/1981 Imataki et al. ....................... 361/125
4,864,455 9/1989 Shimomura et al. ............... 361/125
4,885,561 12/1989 Veverka .............................. 337/190

FOREIGN PATENT DOCUMENTS 340513 12/1977 Austria ......................... H02G 13/00
0013401 7/1980 European Pat. Off. ...... H01H 85/44
0328771 8/1989 European Pat. Off. ...... H01H 85/44

OTHER PUBLICATIONS

Patent Abstracts of Japan, vol. 10, No. 69 (E-389) (2126) Mar. 18, 1986 and JP-A-60218732 (Toshiba) Nov. 1, 1984.

*Primary Examiner*—Brian K. Young
*Assistant Examiner*—S. Jackson
*Attorney, Agent, or Firm*—Watson, Cole, Grindle & Watson

[57] ABSTRACT

A surge arrester arrangement comprising includes a surge arrester (4) and a cut-out device (6) arranged in series with the arrester for automatic disconnection of the arrester in the event of arrester failure. The arrester arrangement is intended to be connected in parallel with an insulator (2) arranged for suspension of a power line (1) from a power line tower (3). The surge arrester (4) is connected to the power line (1) via a connecting link (5) in the form of a flexible electric conductor (10) enclosed in a tube of, for example, aluminium, which is divided into several parts, A helical spring (8) which, for example, may be arranged inside the tube, keeps the connecting link at insulation distance from the power line (1) when the arrester has become disconnected by means of the cut-out device (6).

5 Claims, 1 Drawing Sheet

SURGE ARRESTER ARRANGEMENT

BACKGROUND OF THE INVENTION

1. Field of the Invention

The present invention relates to a surge arrester arrangement comprising a surge arrester and a a cut-out device arranged in series with the arrester for automatic disconnection of the arrester in the event of an arrester failure.

2. The Prior Art

Surge arresters with cut-out devices are previously known, for example from U.S. Pat. No. 2,305,436 and EP-B-0 013 401, and are used, inter alia, in transmission lines to protect against back flashover caused by thunder or against switching surges. The arresters are placed in the towers of the transmission line and are connected between the respective phase line and the grounded tower construction. For a surge arrester connected between phase and ground, a failure in all probability results in a permanent ground fault. However, if the arrester is provided with a cut-out device which automatically disconnects the arrester in the event of a failure, the operation of the line can continue and the faulted arrester can be located and replaced at some suitable time. It is, however, important that the disconnected connection between the line and the arrester does not get near the line in case of hard wind, thus causing a ground fault on the line. Hitherto, there has been no good solution to this problem, and it is therefore common to arrange in line surge arresters, instead of cut-out devices, an open spark gap in series with the arrester. However, this normally provides an inferior protective effect, since it is difficult, from the point of view of voltage, to coordinate an arrester and a series-connected, separate spark gap. Another drawback with this solution is that there is no indication if the arrester has failed.

SUMMARY OF THE INVENTION

The purpose of the present invention is to provide a surge arrester arrangement the arrester is connected to the power line via a connecting link with the following properties:

good flexibility such that the insulator chain is able to swing in case of wind load without stressing the arrester heavy dimensions with respect to corona discharges, that is, a large cross section diameter a low weight spring back property such that the disconnection becomes efficient upon a failure remains suspended straight under the arrester even in case of hard wind after a failure.

These properties are achieved according to the invention by designing the link as a flexible electric conductor enclosed in a tube divided into several parts and including resilient members adjacent the tube for keeping the link at insulation distance from the power line when the arrester has been disconnected by means of the cut-out device.

According to an especially suitable embodiment of the invention, the connecting link comprises a tube divided into several parts, preferably of aluminium, and provided with an inner helical spring extending between the ends of the tube, and with a continuous cable inside the helical spring to attend to the electrical contact between the line and the arrester. By imparting to the helical spring a considerable prestress, the link will remain straight at the bending stresses which may arise because of wired stresses after a failure.

BRIEF DESCRIPTION OF THE DRAWINGS

The invention will be explained in greater detail by describing embodiments with reference to the accompanying drawing, wherein.

DETAILED DESCRIPTION OF THE PREFERRED EMBODIMENT

Figure 1:
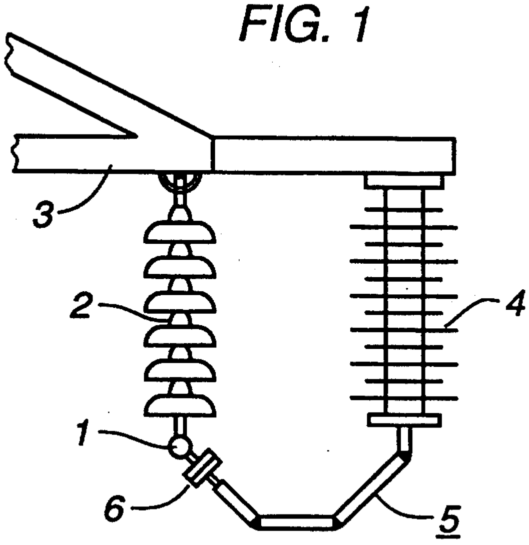
FIG. 1 shows in side view a first embodiment of a surge arrester arrangement designed according to the invention, during normal operation.

FIG. 1 shows a power line 1 which, by means of a suspension insulator chain 2, is suspended from a power line tower, of which only an end portion of the horizontal cross beam 3 of the tower is shown in the figure. At the outer end of the cross beam, at insulation distance from the line 1, a surge arrester 4 is arranged. The lower end of the surge arrester is connected to the line i via a connecting link 5 and a cut-out device 6.

The surge arrester 4 may be of the frequently used design having an elongated insulating casing, in which a number of preferably cylindrical ZnO blocks are arranged between two end electrodes. The cut-out device 6 may, for example, be of the design described in Swedish patent application 9200525-5.

Figure 3:
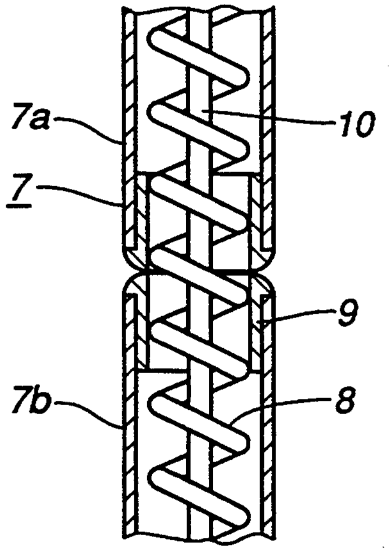
FIG. 3 shows in axial section a part of a connecting link which is part of a surge arrester according to FIG. 1.

The connecting link 5 is made in the form of an aluminium tube 7 (FIG. 3) consisting of a plurality of tube parts *7a, 7b,* arranged one after the other, and provided with an inner helically wound tension spring 8 which extends between the inner ends of the tube. The tube parts *7a, 7b* are provided with end inserts 9, preferably of metal. A continuous cable 10 inside the helical spring 8 attends to the electrical contact between the line 1 and the arrester 4.

Figure 2:
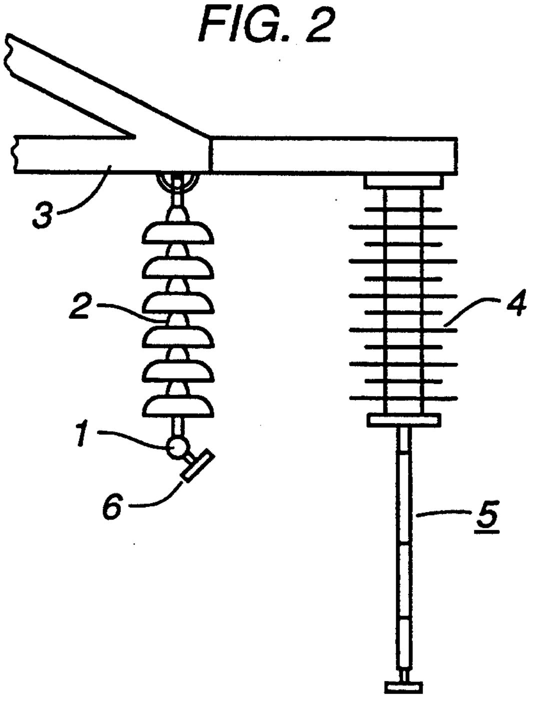
FIG. 2 shows the same surge arrester arrangement after an arrester failure.

In the event of overload and failure of the arrester 4, the arrester is disconnected with the aid of the cut-out device 6, the connecting link 5 thus assuming the vertical position shown in FIG. 2. In that way, the operation of the power line can continue undisturbed in spite of the arrester failure. At the same time, a clear indication of failure of the arrester is obtained. Faulty arresters can therefore be easily located by inspection from the ground or from a helicopter and be replaced at some suitable time.

By imparting to the helical spring 8 a considerable pre-stress and by making the end surfaces of the inserts 9 plane, the connecting link 5 will remain straight at the bending stresses which may arise as a result of wind stresses after a failure. When the link 5 is connected to the line 1, it will exert a sufficient tensile force on the cut-out device 6 to ensure a fast disconnection upon an arrester failure.

Figure 4:
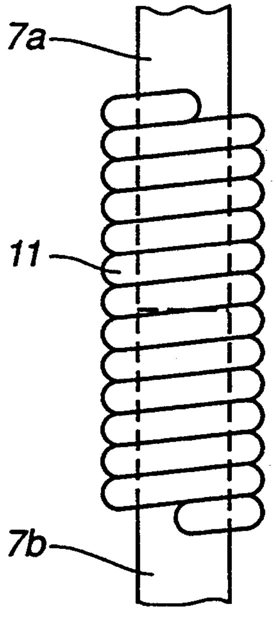
FIG. 4 shows in side view a part of an alternative embodiment of such a connecting link.

FIG. 4 shows an alternative embodiment of the resilient member required for straightening of the connecting link 5. Instead of the long, through-going spring 8 shown in FIG. 3, there is used in the embodiment according to FIG. 4 an outer, relatively short close-wound helical spring 11 at each joint between two adjacent tube parts 7*a* and 7*b*. The spring is fixed in the axial direction by inserting the ends of the spring wire into fixing holes in the respective tube part.

I claim:

1. A surge arrester arrangement comprising a surge arrester and a cut-out device arranged in series with the arrester for automatic disconnection of the arrester in the event of an arrester failure, which arrester arrangement is intended to be connected parallel to an insulator arranged for suspension of a power line from a power line tower, wherein the surge arrester is connected to the power line via a connecting link in the form of a flexible electric conductor enclosed in a tube divided into several parts, resilient members being arranged adjacent the tube to keep the connecting link at insulation distance from the power line when the arrester has become disconnected by means of the cut-out device.

2. An arrangement according to claim 1, wherein said resilient members consist of a helical spring arranged inside the tube and extending between ends of the tube.

3. An arrangement according to claim 1, wherein said resilient members consist of a number of helical springs which surround the tube at each joint between two tube parts.

4. An arrangement according to claim 1, wherein the tube is made of metal.

5. An arrangement according to claim 4, wherein said metal is aluminum.

* * * * *